(12) United States Patent
Haspel

(10) Patent No.: US 7,073,836 B2
(45) Date of Patent: Jul. 11, 2006

(54) CARRYING DEVICE FOR A LOAD SPACE OF A MOTOR VEHICLE

(75) Inventor: Klaus Haspel, Rottenburg (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 11/141,272

(22) Filed: May 31, 2005

(65) Prior Publication Data

US 2006/0045698 A1    Mar. 2, 2006

Related U.S. Application Data

(63) Continuation of application No. 10/141,410, filed on May 8, 2002, now abandoned.

(30) Foreign Application Priority Data

May 18, 2001    (DE)    ............................ 101 25 726

(51) Int. Cl.
*B60R 11/06* (2006.01)

(52) U.S. Cl. .................. 296/37.1; 296/37.16; 224/311

(58) Field of Classification Search ............... 296/37.1; 224/309, 321, 324
See application file for complete search history.

(56) References Cited

U.S. PATENT DOCUMENTS

| 3,082,033 | A | * | 3/1963 | Bosher ..................... 296/37.1 |
| 3,473,680 | A | * | 10/1969 | Downer ..................... 224/311 |
| 4,139,231 | A | * | 2/1979 | Lang et al. ............... 296/37.16 |
| 4,148,516 | A | * | 4/1979 | Gotomyo ................... 296/37.1 |
| 4,671,557 | A | * | 6/1987 | Lemp ..................... 296/37.16 |
| 4,681,247 | A | * | 7/1987 | Prosen ....................... 224/324 |
| 5,544,797 | A | * | 8/1996 | Silva .......................... 224/311 |
| 5,703,316 | A | * | 12/1997 | Madden, Jr. ............... 296/152 |
| 6,572,168 | B1 | * | 6/2003 | Radstake .................... 224/311 |
| 6,616,389 | B1 | * | 9/2003 | Ament et al. ............... 410/118 |
| 6,669,067 | B1 | * | 12/2003 | Schuster .................... 224/311 |
| 6,921,119 | B1 | * | 7/2005 | Haspel et al. ............ 296/37.16 |

FOREIGN PATENT DOCUMENTS

| DE | 25 45 385 A | 4/1977 |
| DE | 88 13 791 U1 | 2/1989 |
| DE | 199 08 314 C1 | 10/2000 |

* cited by examiner

*Primary Examiner*—Kiran B. Patel
(74) *Attorney, Agent, or Firm*—Flynn, Thiel, Boutell & Tanis, P.C.

(57) ABSTRACT

A carrying structure is provided, which is supported on one wall of the loading space with the freedom to move between a rest position and at least one carrying position, where the carrying structure, when in the rest position, fits closely against the wall of the loading space.

15 Claims, 2 Drawing Sheets

CARRYING DEVICE FOR A LOAD SPACE OF A MOTOR VEHICLE

This application is a continuation of U.S. Ser. No. 10/141,410 filed May 8, 2002 now abandoned.

BACKGROUND OF THE DISCLOSURE

1. Field of the Invention

The invention pertains to a carrying device for a loading space of a motor vehicle.

2. Background Art

A carrying device of this type for a trunk of a passenger vehicle of the Mercedes S-Class is known. Here a carrying net in the area of the rear wall of the trunk is stretched across the width of the loading opening. The carrying net is designed in the form of a pocket; the upper edges of the opening of the pocket-like carrying net are formed by elastic tension cords, which are spread apart by hand as needed either to place the object to be transported into the net or to take it out again. When spread open, the carrying net blocks a large part of the rear area of the loading opening. The carrying net must therefore be removed before large, bulky objects such as suitcases or the like can be slid into the trunk.

The task of the invention is to create a carrying device of the type indicated above which makes it possible to hold and transport objects and which nevertheless is positioned in such a way that the trunk can be loaded with bulky objects without interference.

SUMMARY OF THE INVENTION

This task is accomplished by providing a carrying structure which is supported on one wall of the loading space in such a way that it can move between a rest position and at least one carrying position, and by designing the carrying structure so that, when it is in the rest position, it fits closely against the wall of the loading space. Because the carrying structure is attached to one wall and fits closely against this wall when in the rest position, the carrying structure takes up very little space and does not interfere with the loading of bulky objects such as suitcases or the like. The carrying structure therefore does not have to be removed to allow large, bulky objects to be slid into the loading space. The carrying structure can be designed flexibly in the form of a pocket. In an especially preferred embodiment, however, it can also be designed with a high degree of dimensional stability.

In an elaboration of the invention, the carrying structure is located in the trunk of a passenger vehicle, near the bottom surface of an upper, essentially horizontal, roof panel. It is therefore especially advantageous for the carrying structure to be positioned near the bottom surface of the rear hat shelf, which forms the upper boundary of the trunk. This design is especially suitable for carrying structures with at least a high degree of dimensional stability. If flexible carrying structures in the form of pockets or nets are provided, their corners or edges must be attached to the bottom surface of the rear hat shelf so that the carrying structure is kept in a horizontal position and so that the loading and removal opening is present on only one side, preferably on the side facing the rear. According to the previously described state of the art, the edges of this opening can be equipped with tension cords, so that the tensile force of the tension cords keeps the opening closed when the carrier is not being used. Because it is arranged near the bottom surface of the roof panel, there is no interference with the loading or unloading of bulky objects.

In a further elaboration of the invention, the carrying structure is acted upon at all times by the force of restoring spring arrangement, which pushes the carrier toward the rest position. This means that, when the carrying structure is not supporting the load of one or more objects, it will always be pushed into its space-saving rest position. The restoring spring arrangement can be designed in various ways. An essential feature of any embodiment of the restoring spring arrangement is that the spring elements in question must be designed in such a way that they are able to push the carrying structure, when it is in the unloaded state, into the rest position in which it fits closely against the wall of the loading space.

In a further elaboration of the invention, the carrying structure is designed as a curved trough. This design is especially advantageous for a carrying structure with dimensional stability. The trough shape itself ensures that a sufficiently large carrying space is provided. So that the carrying structure fits closely against the wall of the loading space in the rest position, it is preferably designed so that the trough shape conforms approximately, when in the rest position, to the steps, corners, or edges of the boundary surfaces of the loading space.

In a further elaboration of the invention, the carrying structure is supported along one edge with the freedom to pivot around a hinge axis parallel to the wall. As a result, the carrying structure can be attached along only one side, which means that the number of points by which it is connected or fastened to the corresponding wall of the loading space is reduced to a minimum.

In a further elaboration of the invention, the restoring spring arrangement is positioned near the hinge arrangement. The restoring spring arrangement is preferably formed by a helical or shank spring, the turns of which are coaxial to the hinge axis of the hinge arrangement. As a result, the restoring spring arrangements can be installed in a very small amount of space.

In a further elaboration of the invention, the carrying structure is designed as a yoke element, especially in the form of a metal wire component. As a result, the carrying structure can be produced at especially low cost in the form of a bent wire part.

In a further elaboration of the invention, the carrying structure is attached permanently to the vehicle in the area of the hinge axis by means of a bearing unit. This bearing unit can be made of plastic or of metal or of a combination of plastic and metal parts. In a design of plastic, the bearing unit can be produced as an integral part of the carrying structure, as long as the carrying structure is also made of plastic. A film hinge is provided as a suitable hinge arrangement for this design. The carrying structure is preferably connected detachably to the bearing unit, so that the carrying structure can be replaced if it is damaged. In a preferred design, the bearing unit can also be fastened detachably to the wall of the loading space so that the bearing unit can be removed along with the carrying structure if there is no longer any long-term need for the carrier in the loading space.

BRIEF DESCRIPTION OF THE DRAWINGS

Additional advantages and features of the invention can be derived from the claims and from the following description of a preferred exemplary embodiment of the invention, which is illustrated on the basis of the drawings:

DETAILED DESCRIPTION OF THE DRAWINGS

Figure 1:
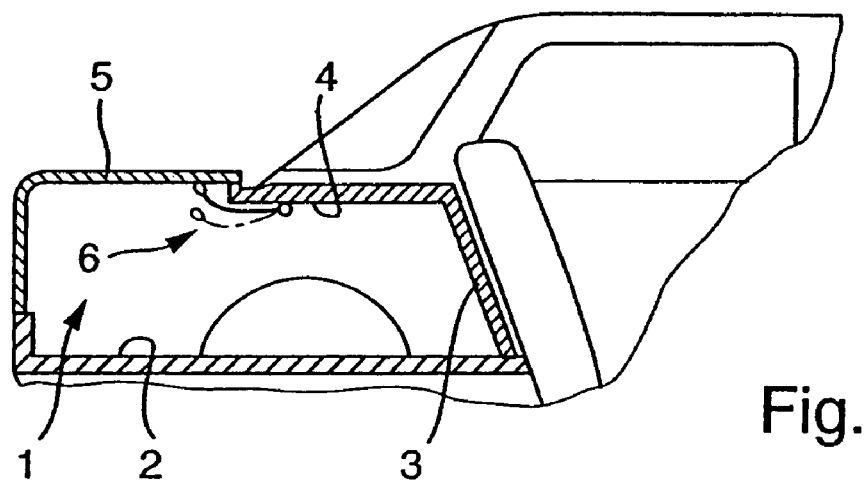
FIG. 1 shows a schematic diagram of a longitudinal section through the rear area of a passenger vehicle, which is provided with an embodiment of a carrying device according to the invention.

While this invention is susceptible of embodiment in many different forms, there is shown in the drawings, and will be described in detail herein, one specific embodiment, with the understanding that the present embodiment is to be considered as an exemplification of the principles of the invention and is not intended to limit the invention to the embodiments illustrated.

Figure 4:
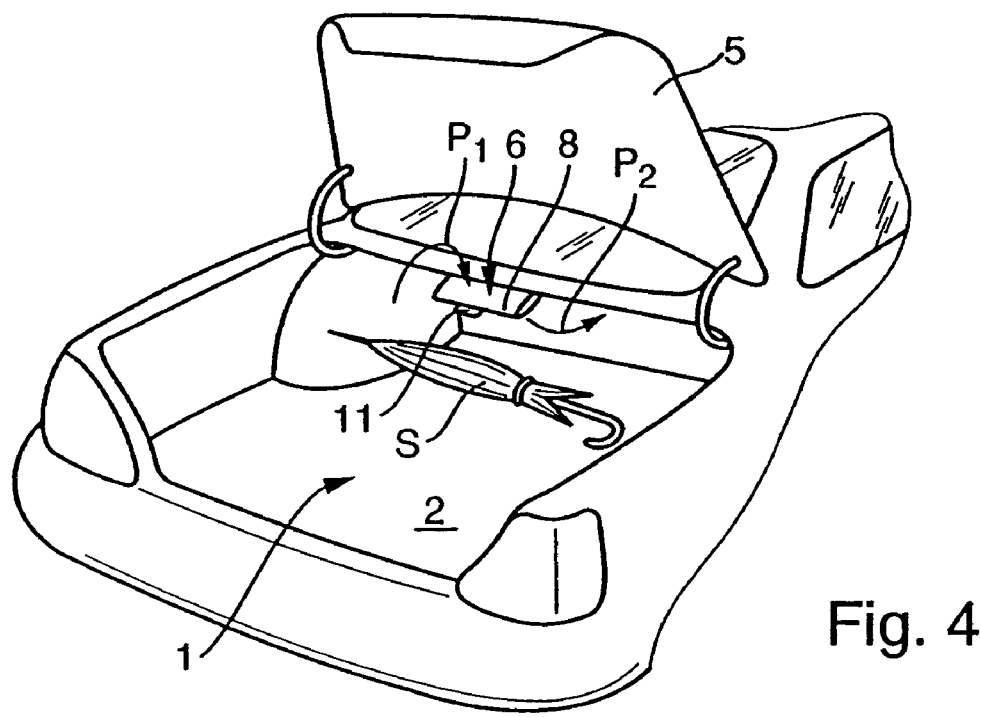
FIG. 4 shows a perspective view of the carrying device according to FIGS. 1–3 after the trunk of the passenger vehicle has been opened.

A motor vehicle in the form of a passenger car has, according to FIGS. 1 and 4, a loading space in the form of a trunk 1. The passenger vehicle is designed as a notchback sedan and is equipped with a trunk lid 5, which closes the loading opening of the trunk 1.

The trunk 1 is provided with a trunk floor 2; with an end wall 3, located toward the front with respect to the direction of travel; and with a roof panel 4 above, which forms the bottom of a rear hat shelf. Toward the rear with respect to the direction of travel, the trunk 1 is limited by a rear wall (not numbered) and by a downward-extending section of the trunk lid 5. The upper, essentially horizontal boundary surface of the trunk 1 is thus formed by the roof panel 4 and by a horizontal section of the trunk lid 5. Near the edge of the loading opening, the roof panel 4 terminates with an upward-bent flange 7 (FIGS. 2 and 3), which carries an elastic seal at the edge for the trunk lid. The edge flange 7 forms a step in the upper, horizontal boundary surface of the trunk 1, because the horizontal section of the trunk lid 5 is shifted onto a higher plane of the vehicle relative to the plane of the roof wall 4.

Figure 5:
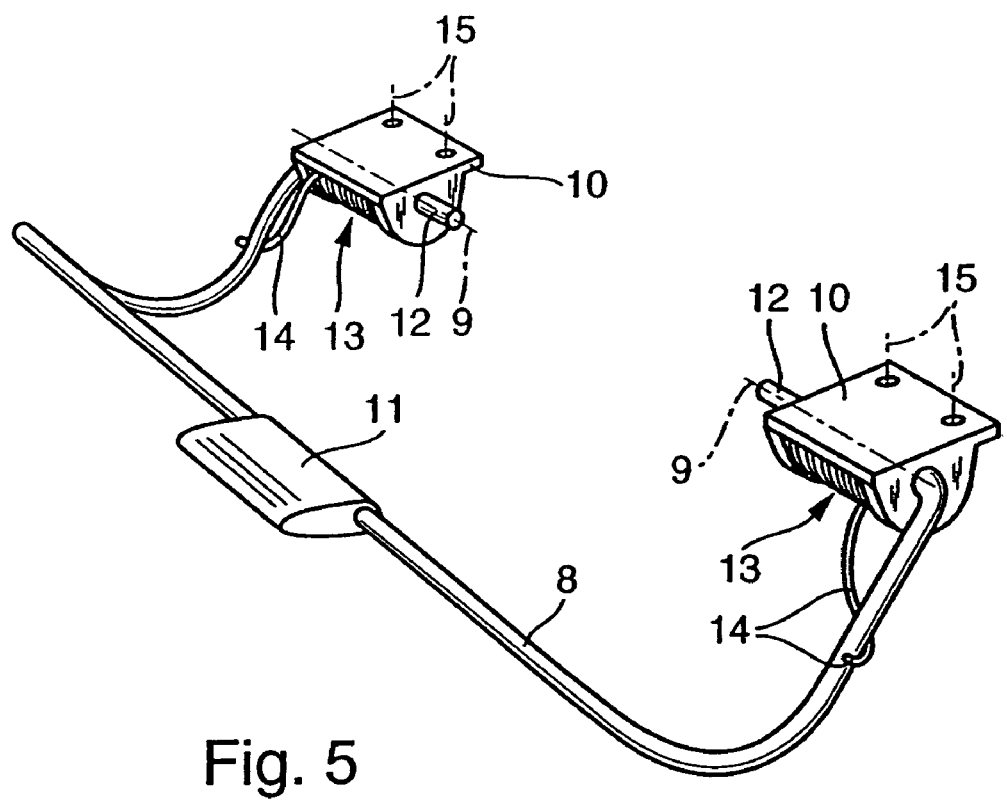
FIG. 5 shows an enlarged, perspective view of the carrying device in the uninstalled state.

On the bottom surface of the roof panel 4, a carrier 6 with a carrying structure 8 is installed, which is designed to carry small objects and which serves in particular as a carrier for an umbrella or parasol S. In the exemplary embodiment shown, as can be seen in FIGS. 4 and 5, the carrying structure 8 is made as a one-piece yoke element. This yoke element has two lateral shanks, each curved uniformly in the same direction, and a transverse web, which forms a single part with the shanks and connects them to each other, on which web a gripping element 11 is mounted. As a result of the curvature of the two shanks, a trough-like, curved carrying surface for the carrying structure 8 is obtained, in which the umbrella S can be placed.

At the ends opposite the transverse web, the shanks continue integrally as hinge shaft parts 12, which are bent at a right angle, each of which is supported rotatably in a bearing bracket 10 of a bearing unit for the carrying structure 8. The two hinge shaft parts 12, as can be seen in FIG. 5, point inward toward each other and are aligned with each other along a common hinge axis 9 of the bearing unit and thus of the bearing brackets 10. The two bearing brackets 10 of the bearing unit are rigidly connected to the roof panel 4 by fastening means 15. Detachable connectors such as screws or clips can be used as fastening means, but it is also possible to use permanent connecting means such as rivets, welds, brazed joints, or the like.

In the exemplary embodiment shown here, the carrying structure is made by bending a relatively stiff piece of metal wire so that the carrying structure 8 has at least a considerable degree of dimensional stability.

Figure 2:
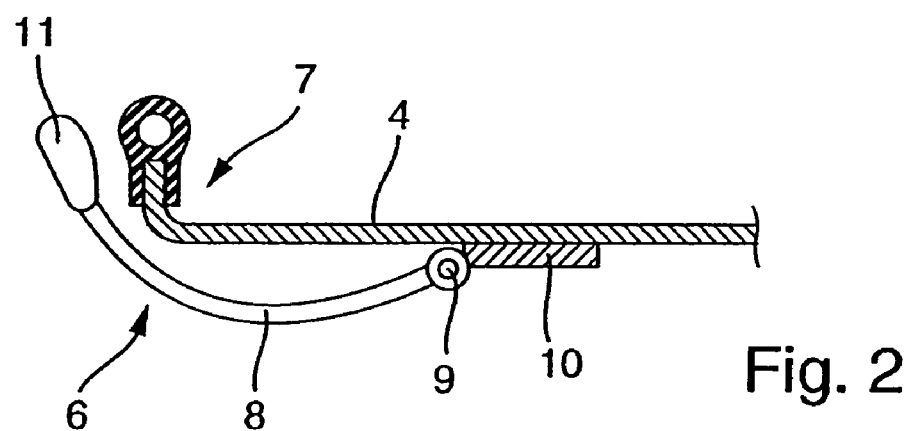
FIG. 2 shows an enlarged view of the carrying device of FIG. 1 in a first position.
Figure 3:
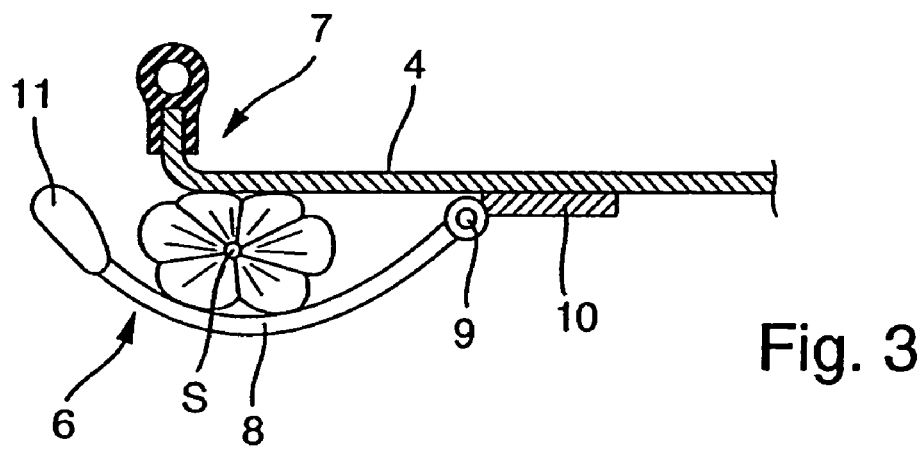
FIG. 3 shows the carrying device according to FIG. 2 in a carrying position.

As can be seen in FIG. 2, the curvature of the carrying structure 8 is selected and the bearing unit, that is, the bearing brackets 10, are positioned in such a way on the bottom surface of the roof panel 4, i.e., a certain distance away from the edge flange 7, that the transverse web and the gripping element 11 of the carrying structure 8 project into the stepped area of greater height underneath the horizontal section of the trunk lid 5. As a result, when the carrying structure is in its rest position, i.e., in the position in which it is resting against the corner near the edge flange 7, it fits closely, at least for the most part, against the roof panel 4 and the corresponding stepped area near the edge flange 7. When the carrier is in this position on the roof panel 4, there is therefore almost no downward-projecting structure to cause interference. The open cross section of the loading space is thus almost completely unobstructed by the carrier when the carrier is in its rest position.

To ensure that the carrying structure remains in its rest position, fitting closely against the roof panel 4, as long as it is not under any load as a result of carrying an object, a restoring spring arrangement 13, 14 is provided, which exercises a restoring function on the carrying structure 8, attempting to return it to the rest position. In the case of the exemplary embodiment shown, the restoring spring arrangement consists of two shank-type springs 13, 14. One of these arrangements is integrated into each of the bearing brackets 10. Each shank spring 13, 14 has a defined number of helical turns 13, which are wound coaxially around its associated hinge shaft part 12 inside the bearing bracket 10, coaxial to the hinge axis 9. A support shank (not shown), permanently attached to the vehicle, is situated inside the bearing bracket 10. An opposite working shank 14 projects toward the associated shank of the yoke and surrounds it in a positive, form-locking manner, so that the corresponding restoring force can be transmitted to the shanks of the yoke and thus to the carrying structure 8. The restoring force of the restoring spring arrangement 13, 14 is selected so that an elongated object with the weight of an umbrella S will be carried reliably and held against the bottom surface of the roof wall 4 under normal driving conditions, that is, even under the loads associated with vibrations, braking, and acceleration. The restoring force is also limited in such a way, however, that the carrier can be opened by hand. That is, the gripping element 11 and the carrying structure can be pressed down (in the direction of arrow $P_2$) without the need for an excessive amount of force.

So that an umbrella S or some other object can be placed into the carrying structure 8, the carrying structure is pressed down by means of the gripping element 11 in the direction of arrow $P_2$. Next, the umbrella S or other object is inserted into the carrying trough thus formed in the direction of arrow $P_1$. Then the gripping element 11 is released, as a result of which the restoring force of the restoring spring arrangement 13, 14 presses the umbrella S or other object upward toward the roof wall 4 and secures it in this position.

The foregoing description and drawings merely explain and illustrate the invention, and the invention is not limited thereto except insofar as the pending claims are so limited, as those skilled in the art and having the present disclosure before them will be able to make modifications and variations therein without departing from the scope of the invention.

I claim:

1. A combination of:
a loading space of a motor vehicle defined by a truck floor, an end wall, opposing side walls, a roof panel and a trunk lid forming a closed vehicle storage compartment, said trunk lid and said roof panel providing a ceiling, said trunk lid being pivotably mounted to said roof panel to provide access to the compartment; and
a carrying structure secured to an inner surface of said roof panel and projecting downwardly into the loading space, said carrying structure including a transverse web movable between a rest position fitted closely against said roof panel and an article receiving position wherein said web of said carrying structure is spaced from said roof panel,
wherein said carrying structure receives and stores an article near the inner surface of said roof panel while maintaining loading space in the vehicle storage compartment below the article.

2. The combination of claim 1, wherein said carrying structure is fitted closely to said trunk lid and said roof panel in the rest position.

3. The combination of claim 1, wherein said carrying structure is rigid and is pivotable about a pivot axis at an edge thereof, and a spring arrangement pivots said carrying structure toward the rest position and maintains said carrying structure in the rest position when no article is received by said carrying structure.

4. The combination of claim 1, wherein said web comprises an elongate transverse web defining an axis along a length thereof, said web having first and second ends, and said carrying structure further comprising lateral curved shanks extending transverse from said web, each of said curved shanks having a first end integral with the respective end of said web and a second mounting end, said curved shanks each defining a trough shape relative to a horizontal plane in the rest position to maintain an article placed thereon.

5. The combination of claim 4, further comprising:
a mounting arrangement secured to said roof panel, said mounting arrangement receiving the mounting ends of said curved shanks of the carrying structure, said mounting arrangement enabling pivoting movement of said web of said carrying structure about an axis that is parallel to the axis of said web.

6. The combination of claim 5, wherein said mounting arrangement comprises first and second spaced mounting units secured to said roof panel, each said mounting unit receiving the mounting end of one of said curved sections,
said combination further comprising a pair of spring elements, each said spring element being associated with one of said mounting units and a respective one of said curved shanks, the spring elements cooperating with said shanks to maintain said web in the rest position,
wherein applying a downward force to said web of said carrying structure pivots said web downwardly along the entire length thereof, whereby an article can be placed on said carrying structure, release of said web enabling said carrying structure to return toward the rest position.

7. The combination of claim 6, wherein said spaced mounting units comprise plastic and said carrying structure comprises a monolithic metal wire.

8. A combination of:
a loading space of a motor vehicle defined by a trunk floor, an end wall, opposing side walls, a roof panel and a trunk lid forming a closed vehicle storage compartment, the trunk lid being pivotably mounted to an edge flange of the roof panel to provide access to the storage compartment;
a carrying structure secured to an inner surface of said roof panel and projecting downwardly into the loading space, said carrying structure comprising:
a rigid carrier comprising:
an elongate transverse web defining an axis along a length thereof, said web having first and second ends, and
uniformly curved lateral shanks extending transverse from the web, each of said shanks having a first end integral with the respective end of the web and a second mounting end;
spaced mounting brackets secured to said roof panel, said mounting brackets receiving the mounting ends of said shanks of said carrier, said mounting brackets enabling pivoting movement of said web of said carrier about an axis extending through said spaced mounting brackets; and
a pair of spring elements, each said spring element being associated with one of said mounting brackets and the respective one of said shanks of said carrier, said spring elements cooperating to maintain said web in a rest position at an upper location in the loading space adjacent said trunk lid,
wherein applying a force to said web of said carrier pivots said web downwardly along the entire length thereof, whereby an object can be placed thereon, wherein release of said web enables said carrier to return toward the rest position so that an article is stored near the inner surface of said roof panel while maintaining loading space in the vehicle storage compartment below the article.

9. The combination of claim 8, wherein in the rest position said shanks of said carrier define a trough like shape relative to a horizontal plane for supporting an umbrella shaped article placed only on said curved sections of said carrier.

10. The combination of claim 9, wherein the mounting ends of said shanks of said carrier comprise two hinge shaft parts that are oriented inwardly directly toward each other along a common hinge axis of said mounting brackets that is parallel to the axis defined by said web.

11. The combination of claim 10, wherein said web and said shanks comprise a monolithic metal wire and said mounting brackets are made of plastic.

12. The combination of claim 8, wherein the axis of said web is parallel to an axis defined by hinges securing the trunk lid to the roof panel.

13. The combination of claim 8, wherein said web fits closely against an underside surface of the trunk lid when said trunk lid closes the storage compartment.

14. The combination of claim 8, wherein an article placed on said carrier can be supported against at least one of the underside surface of said trunk lid and an underside surface of said roof panel adjacent said trunk lid.

15. The combination of claim 8, further comprising a gripping element secured to said web of said rigid carrier.

* * * * *